United States Patent
Guo

(10) Patent No.: US 10,323,661 B2
(45) Date of Patent: Jun. 18, 2019

(54) CYLINDER AND ADSORPTION SEPARATION DEVICE USING THE CYLINDER

(71) Applicant: SHENZHEN BITEMAN SCIENCE & TECHNOLOGY CO., LTD., Shenzhen (CN)

(72) Inventor: Yinghui Guo, Shenzhen (CN)

(73) Assignee: SHENZHEN BITEMAN SCIENCE & TECHNOLOGY CO., LTD., Shenzhen (CN)

( * ) Notice: Subject to any disclaimer, the term of this patent is extended or adjusted under 35 U.S.C. 154(b) by 231 days.

(21) Appl. No.: 15/301,286

(22) PCT Filed: Dec. 5, 2014

(86) PCT No.: PCT/CN2014/093151
§ 371 (c)(1),
(2) Date: Sep. 30, 2016

(87) PCT Pub. No.: WO2015/154494
PCT Pub. Date: Oct. 15, 2015

(65) Prior Publication Data
US 2017/0023029 A1 Jan. 26, 2017

(30) Foreign Application Priority Data
Apr. 11, 2014 (CN) .................... 2014 2 0176308 U

(51) Int. Cl.
*F15B 15/14* (2006.01)
*F15B 15/17* (2006.01)
(Continued)

(52) U.S. Cl.
CPC .............. *F15B 15/17* (2013.01); *F15B 15/00* (2013.01); *F15B 15/14* (2013.01); *F15B 15/149* (2013.01); *F15B 15/1452* (2013.01); *F15B 15/16* (2013.01)

(58) Field of Classification Search
CPC .. F15B 15/17; F15B 15/00; F15B 2013/0412; F15B 15/14; F15B 15/1452
(Continued)

(56) References Cited

U.S. PATENT DOCUMENTS

2012/0160093 A1* 6/2012 Taniguchi ........... F15B 15/1433
92/165 R
2013/0167726 A1* 7/2013 Guo ................... B01D 53/0415
96/133

FOREIGN PATENT DOCUMENTS

| CN | 201310504 Y | 9/2009 |
| CN | 201377477 Y | 1/2010 |

(Continued)

OTHER PUBLICATIONS

International Search Report in corresponding PCT Application No. PCT/CN2014/093151, dated Feb. 27, 2015.

*Primary Examiner* — F Daniel Lopez
*Assistant Examiner* — Daniel S Collins
(74) *Attorney, Agent, or Firm* — Leason Ellis LLP

(57) ABSTRACT

An adsorption separation device is used with a cylinder, wherein the cylinder comprises a cylinder body, a first piston, and a second piston. The first piston and the second piston are arranged inside the cylinder body, and the first piston and the second piston are be spaced from each other. The cylinder further comprises a first shaft and a second shaft where the first shaft extends into the cylinder body and is connected with the first piston, and the second shaft is slidably sleeved in the first shaft and connected with the second piston. The adsorption separation device includes the (Continued)

cylinder. The cylinder and the adsorption separation device are actually two or more cylinders sharing the same cylinder body and controlling two or more pistons and shafts respectively. The control directions and strokes of the pistons are independent relative to each other and do not affect each other.

7 Claims, 8 Drawing Sheets

(51) Int. Cl.
     *F15B 15/00*     (2006.01)
     *F15B 15/16*     (2006.01)

(58) Field of Classification Search
     USPC ........................................................ 92/69.1
     See application file for complete search history.

(56) References Cited

FOREIGN PATENT DOCUMENTS

| | | | |
|---|---|---|---|
| JP | 57184708 | A | 11/1982 |
| JP | 06100207 | B2 | 12/1994 |

* cited by examiner

CYLINDER AND ADSORPTION SEPARATION DEVICE USING THE CYLINDER

CROSS-REFERENCE TO RELATED PATENT APPLICATIONS

This application is a U.S. National Phase Application under 35 U.S.C. § 371 of International Patent Application No. PCT/CN2014/093151, filed Dec. 5, 2014 and claims priority from Chinese Application No. 201420176308.7, filed Apr. 11, 2014, which are incorporated herein by reference in their entireties. The International Application was published in Chinese on Oct. 15, 2015 as International Publication No. WO 2015/154494 A1.

FIELD OF THE INVENTION

The present invention relates to the technical field of cylinders, and more particularly to a cylinder and an adsorption separation device using the cylinder.

BACKGROUND OF THE INVENTION

In existing cylinders, each cylinder can usually control only one shaft. When two or more shafts need to be controlled, two or more cylinders need to be used. Thus, large assembly space and much cost are required.

SUMMARY OF THE INVENTION

An objective of the present invention is to overcome the drawbacks of the above-described prior art. A cylinder and an adsorption separation device using the cylinder, which need smaller assembly space and less cost, are provided.

The present invention is realized by the following solution: a cylinder comprises a cylinder body, a first piston, and a second piston; the first piston and the second piston are arranged inside the cylinder body, and the first piston and the second piston are arranged to be spaced from each other; the cylinder further comprises a first shaft and a second shaft, the first shaft extends into the cylinder body and is connected with the first piston, and the second shaft is slidably sleeved in the first shaft and connected with the second piston.

Preferably, the first piston and the second piston separate the cylinder body into three independent chambers, and a sidewall of the cylinder body is provided with vent holes communicating with the three independent chambers respectively.

Preferably, a seal ring is arranged between the first shaft and the second shaft.

Preferably, each of an end of the first shaft extending out of the cylinder body and an end of the second shaft extending out of the cylinder body is provided with a screw connection portion.

Preferably, each of an outside of the first piston and an outside of the second piston is sheathed in a piston ring.

Preferably, the cylinder body is provided therein with a third piston, the third piston is connected with a third shaft, and the third shaft is slidably sleeved in the second shaft.

Preferably, each of the vent holes is communicated with a vent pipe joint.

The present invention further provides an adsorption separation device, wherein the adsorption separation device includes the above-described cylinder.

Preferably, the adsorption separation device comprises an air inlet assembly, an air outlet assembly, and an adsorption separation assembly, the air inlet assembly and the air outlet assembly are respectively connected to two ends of the adsorption separation assembly; the air inlet assembly is provided with an air inlet configured for gas intake and an air vent configured for gas exhaust, and the cylinder is connected with an air inlet pressing plate configured to control the air inlet and an exhaust pressing plate configured to control the air vent.

Preferably, the air vent is communicated with an exhaust valve.

In the cylinder and the adsorption separation device using the cylinder provided by the embodiments of the present invention, there are actually two or more cylinders sharing the same cylinder body and controlling two or more pistons and shafts respectively, the control directions and strokes are independent relative to each other and do not affect each other. Moreover, the assembly space can be smaller, and the cost can be less.

BRIEF DESCRIPTION OF THE DRAWINGS

In order to explain technical solutions of embodiments of the present invention more clearly, the accompanying drawings that are needed to be used in the embodiments will be simply described below. It is obvious that the accompanying drawings described below are only some embodiments of the present invention, and one of ordinary skill in the art can, on the premise of paying no creative work, obtain other accompanying drawings according to the existing accompanying drawings.

DETAILED DESCRIPTION OF THE PREFERRED EMBODIMENT

In order to make the purposes, technical solutions, and advantages of the present invention be clearer, the present invention will be further described in detail hereafter with reference to the accompanying drawings and embodiments. It should be understood that the embodiments described herein are only intended to illustrate but not to limit the present invention.

It needs to be noted that when an element is described as "fixed to" or "arranged at" another element, it may be in direct contact with the another element, while between the two elements there may also be an intermediate element; and when an element is described as "connected to" another element, it may be connected to the other element directly, while between the two elements there may also be an intermediate element.

It needs to be further noted that the position terms used in the embodiments, such as "left", "right", "upper", "lower", and so on, are only relative concepts corresponding to each other or take normal using statuses of products as references, and should not be considered as having limitations.

Figure 1:
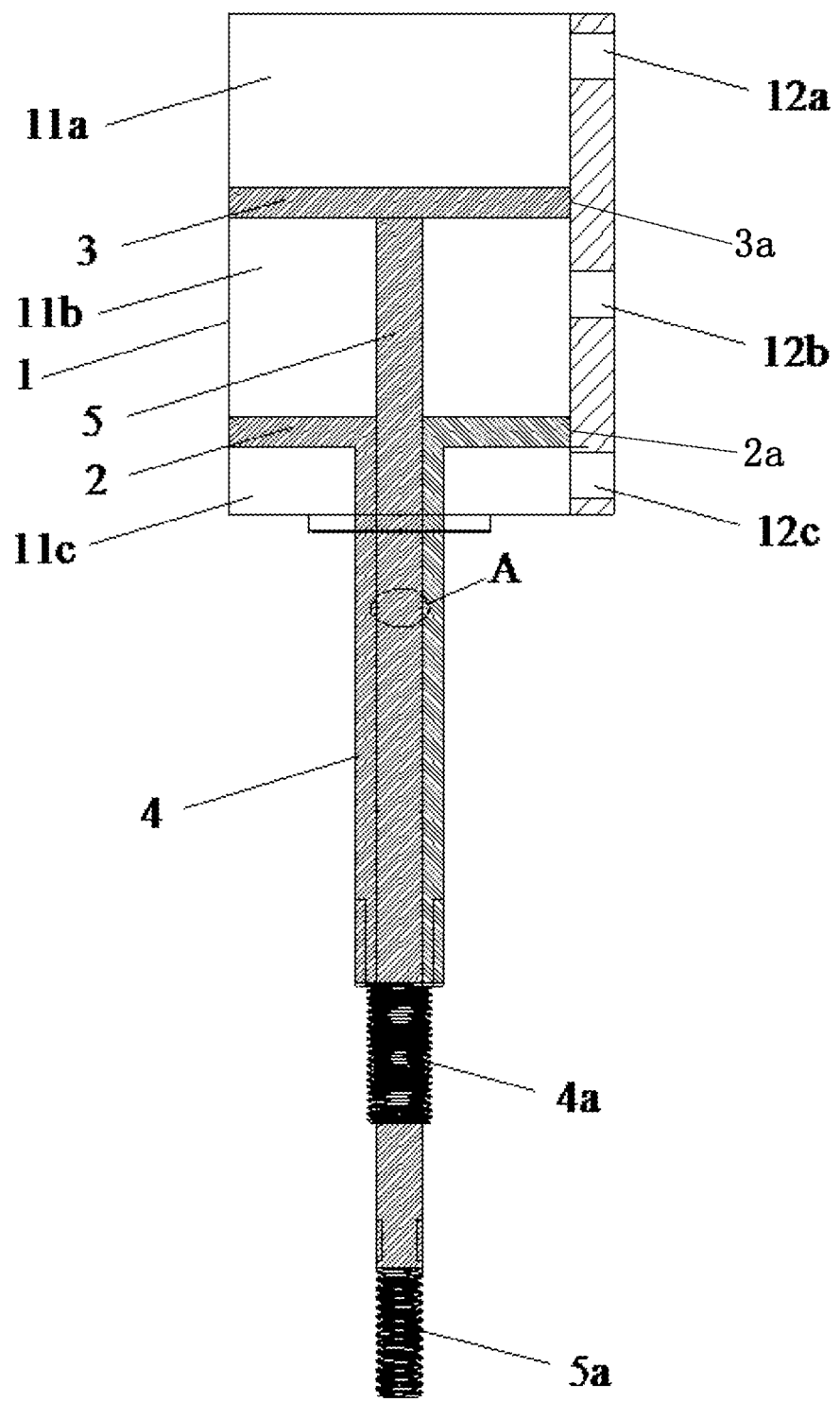
FIG. 1 is a sectional schematic view of a cylinder provided by one embodiment of the present invention.
Figure 2:
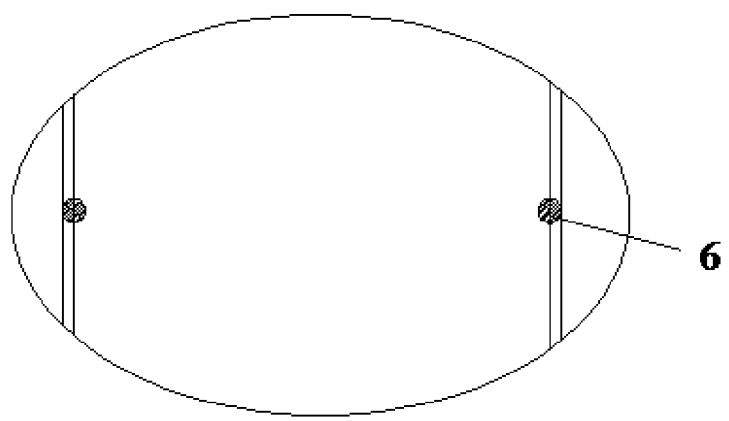
FIG. 2 is a partially enlarged view of the part A shown in FIG. 1.
Figure 3:
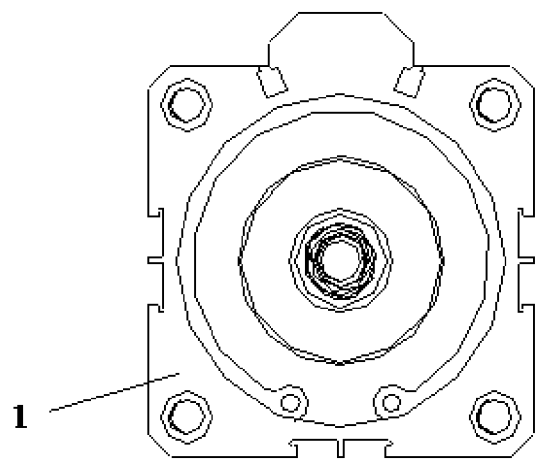
FIG. 3 is a vertical view of a cylinder provided by one embodiment of the present invention.
Figure 4:
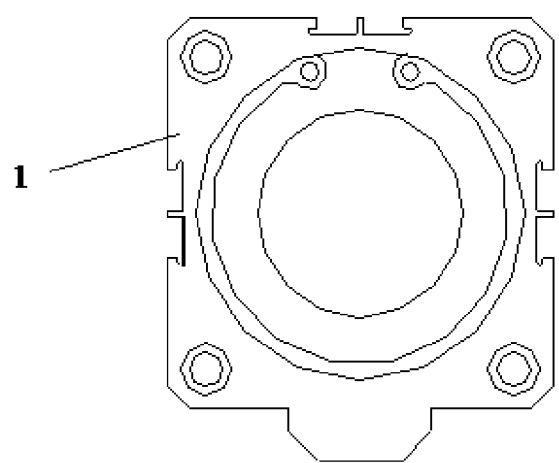
FIG. 4 is a bottom view of a cylinder provided by one embodiment of the present invention.
Figure 5:
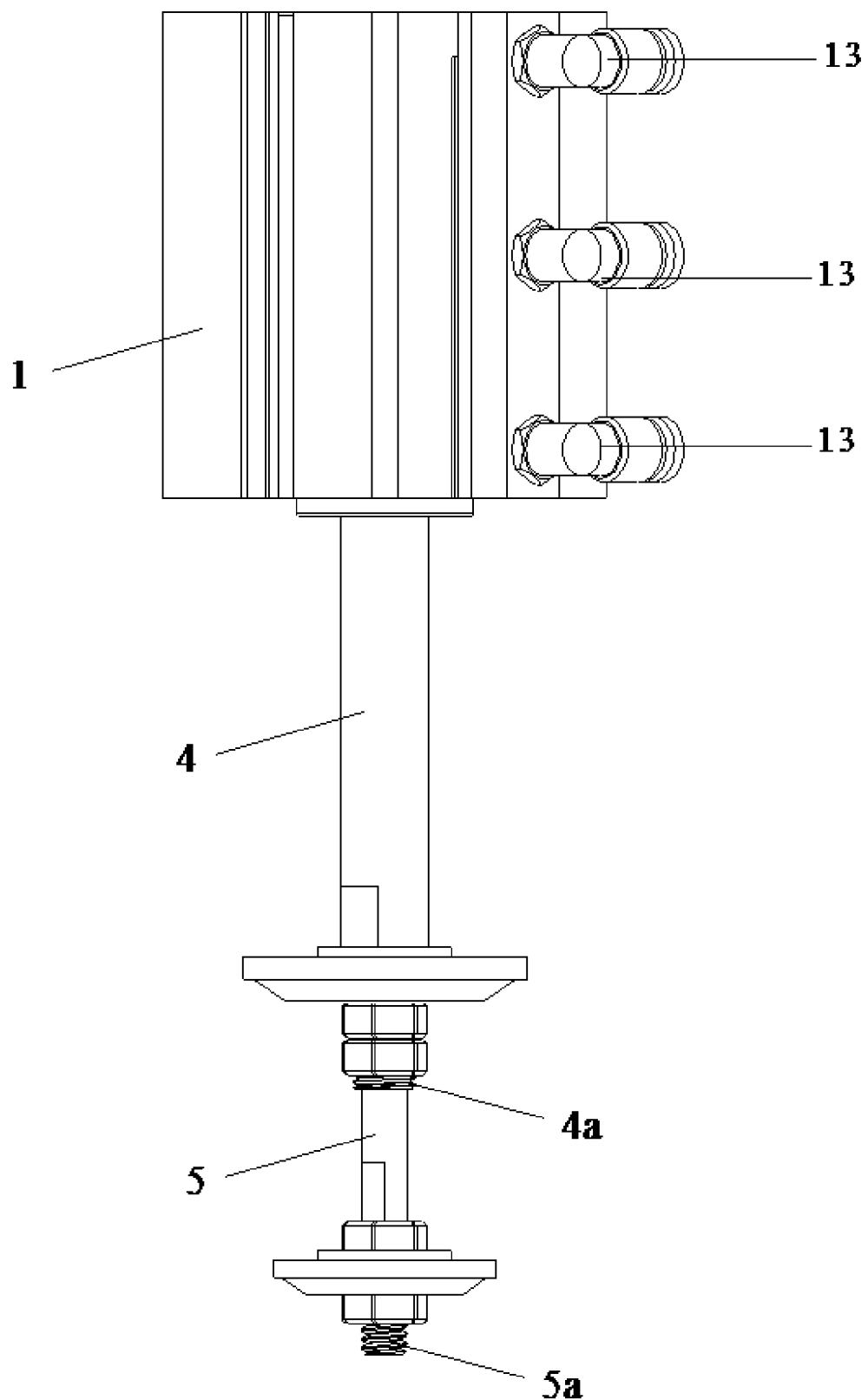
FIG. 5 is a perspective schematic view of a cylinder provided by one embodiment of the present invention.
Figure 6:
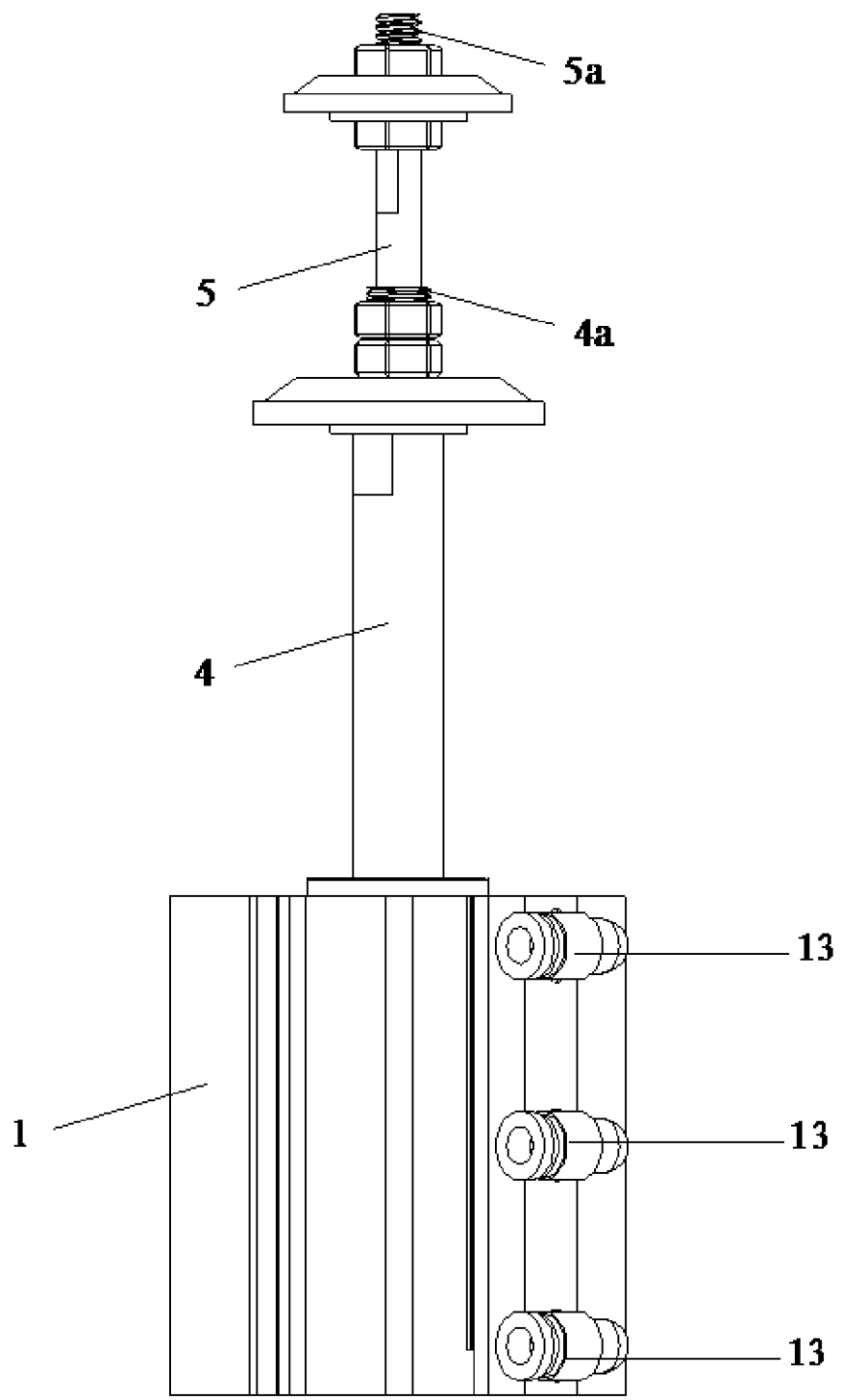
FIG. 6 is another perspective schematic view of a cylinder provided by one embodiment of the present invention.

As shown in FIGS. 1-6, a cylinder provided by one embodiment of the present invention comprises a cylinder body 1, a first piston 2, and a second piston 3; the first piston 2 and the second piston 3 are arranged inside the cylinder body 1, and the first piston 2 and the second piston 3 are arranged to be spaced from each other; the cylinder 1 further comprises a first shaft 4 and a second shaft 5, the first shaft 4 extends into the cylinder body 1 and is connected with the first piston 2, and the second shaft 5 is slidably sleeved in the first shaft 4 and connected with the second piston. By such design, the first piston 2 and the second piston 3 control the first shaft 4 and the second shaft 5 respectively, so that the same cylinder body 1 can realize different controls by means of two or more pistons and shafts, and the assembly space can be smaller and the cost can be less.

In particular, as shown in FIGS. 1-6, the first piston 2 and the second piston 3 separate the cylinder body 1 into three independent chambers 11a, 11b, and 11c. A sidewall of the cylinder body 1 is provided with three vent holes 12a, 12b, and 12c, which are communicated with the three independent chambers 11a, 11b, and 11c respectively, so that the pistons can be controlled respectively and the shafts can be controlled to move.

In particular, as shown in FIGS. 1-6, a seal ring 6 is arranged between the first shaft 4 and the second shaft 5 to prevent air leakage.

In particular, as shown in FIGS. 1-6, ends of the first shaft 4 and the second shaft 5 extending out of the cylinder body 1 are provided with screw connection portions 4a and 5a respectively, so that the first shaft 4 and/or the second shaft 5 can be easily connected to external elements to work.

In particular, as shown in FIGS. 1-6, the outsides of the first piston 2 and the second piston 3 are sheathed in piston rings 2a and 3a respectively, so that the independent chambers 11a, 11b, and 11c in the cylinder body 1 can be sealed effectively.

In particular, the cylinder body 1 is further provided therein with a third piston (not shown), the third piston is connected with a third shaft (not shown), and the third shaft is slidably sleeved in the second shaft 5. In this way, a plurality of pistons and shafts can be controlled by the same cylinder body 1, and thus the assembly space can be saved. In specific applications, a fourth piston and a fourth shaft, a fifth piston and a fifth shaft, and even more pistons and shafts may be added, the specific numbers of the pistons and the shafts can be determined according to actual requirements, and these variations are all included in the protection scope of the present invention.

In particular, as shown in FIGS. 1-6, each of the vent holes 12a, 12b, and 12c is communicated with a vent pipe joint 13, so that gas can be input into the cylinder body 1 via a pipe.

The cylinder provided by the above-described embodiment of the present invention can greatly reduce the assembly space and volume of the cylinder, and thus can solve many problems occurring in the case that a plurality of cylinders may need to be mounted in small assembly space to realize control. In the cylinder provided by the embodiment of the present invention, there are actually two or more cylinders sharing the same cylinder body and realizing different controls via the pistons, the inner shaft(s) also serving as piston rods (e.g., the first shaft 4), and the outer shaft(s) (e.g., the second shaft 5), the control directions and strokes are independent relative to each other and do not affect each other.

Figure 7:
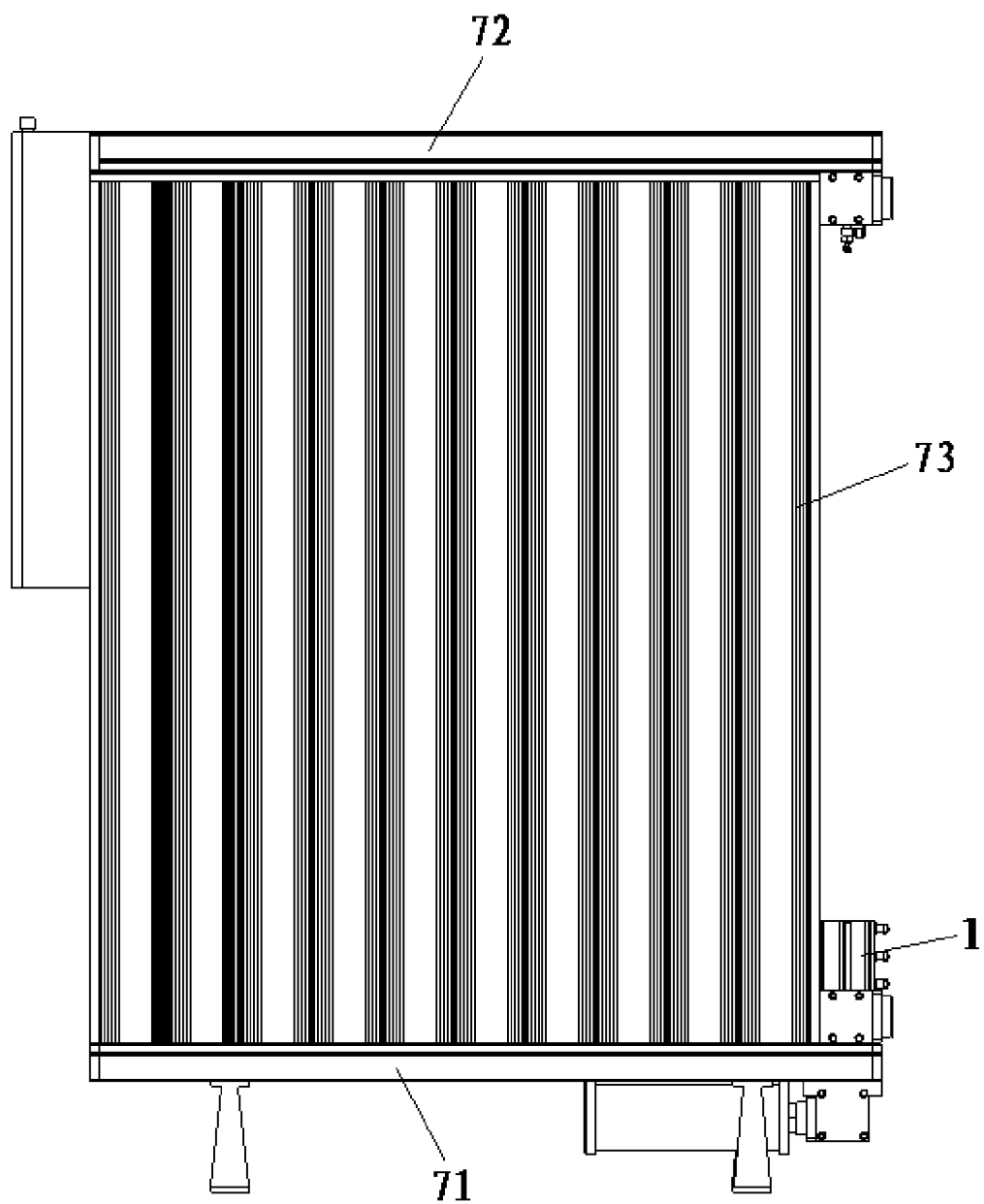
FIG. 7 is a planar schematic view of an adsorption separation device provided by one embodiment of the present invention.
Figure 8:
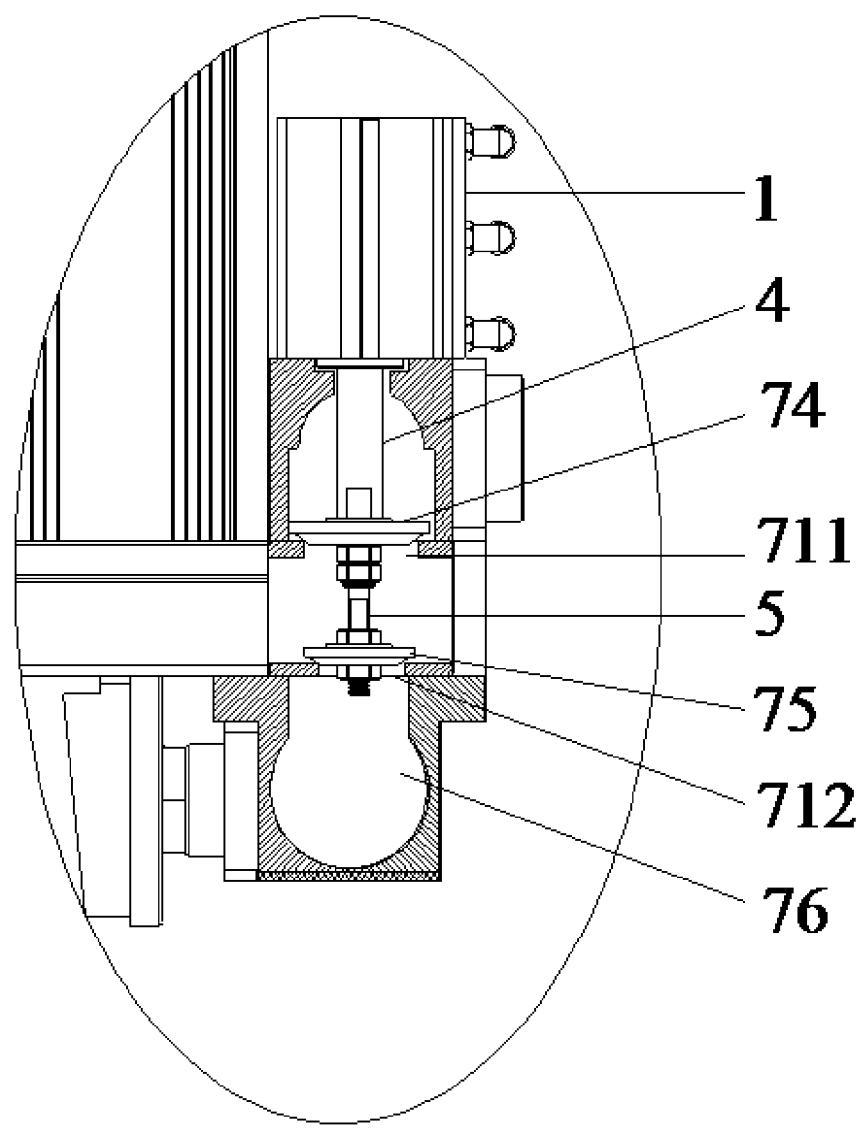
FIG. 8 is a partial sectional schematic view of an adsorption separation device provided by one embodiment of the present invention.
Figure 9:
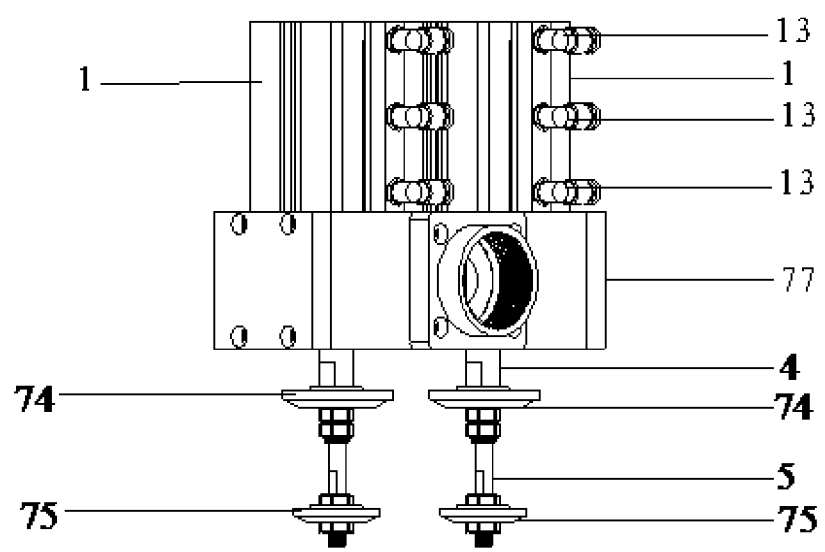
FIG. 9 is a perspective schematic view of a cylinder of an adsorption separation device provided by one embodiment of the present invention.

As shown in FIGS. 1-9, one embodiment of the present invention provides an adsorption separation device, wherein the adsorption separation device includes the above-described cylinder.

In particular, as shown in FIGS. 1-9, the adsorption separation device comprises an air inlet assembly 71, an air outlet assembly 72, and an adsorption separation assembly 73, the air inlet assembly 71 and the air outlet assembly 72 are respectively connected to two ends of the adsorption separation assembly 73; the air inlet assembly 71 is provided with an air inlet 711 configured to allow gas to enter and an air vent 712 configured to allow gas to exhaust, and the cylinder is connected with an air inlet pressing plate 74 configured to control the air inlet 711 and an exhaust pressing plate 75 configured to control the air vent 712. The air inlet assembly 71 can include an inlet valve seat 77, and the cylinder can be connected to the inlet valve seat 77. The air inlet pressing plate 74 can be fixed by one or two nuts threadedly connected with the screw connection portion 4a of the first shaft 4, and the exhaust pressing plate 75 can be fixed by one or two nuts threadedly connected with the screw connection portion 5a of the second shaft 5. In this way, by gas intake and gas exhaust through the three vent holes 12a, 12b, and 12c of the cylinder body 1, actions of the air inlet pressing plate 74 and the exhaust pressing plate 75 can be controlled, and thus gas intake and gas exhaust of the adsorption separation device can be realized.

In particular, the air vent 712 is communicated with an exhaust valve 76. In the adsorption separation device provided by the embodiment of the present invention, the air inlet 711 and the air vent 712 can be respectively controlled by a driving assembly including integrated multiple elements, so that an exhaust cylinder with a silencer configured to maintain a uniform pressure can be removed, and the operation can be more stable and reliable. Since the cylinder is an integrated structure, the number of control cylinders and the assembly space can be greatly reduced.

In the cylinder and the adsorption separation device using the cylinder provided by the embodiments of the present invention, there are actually two or more cylinders sharing the same cylinder body 1 and controlling two or more pistons (e.g., 2 and 3) and shafts (e.g., 4 and 5) respectively, the control directions and strokes are independent relative to each other and do not affect each other. Moreover, the assembly space can be smaller, and the cost can be less.

The above are only preferred embodiments of the present invention and are not intended to limit the present invention. Any modification, equivalent replacement, and improvement made within the spirit and principle of the present invention should be included in the protection scope of the present invention.

What is claimed is:
1. An adsorption separation device comprising:
a cylinder comprising a cylinder body, a first piston, and a second piston, wherein the first piston and the second piston are arranged inside the cylinder body and are spaced from each other, wherein the cylinder further comprises a first shaft and a second shaft, the first shaft extends into the cylinder body and is connected with the first piston, and the second shaft is slidably sleeved in the first shaft and is connected with the second piston;

an air inlet assembly provided with an air inlet configured for gas intake and an air vent configured for gas exhaust, said air inlet assembly being further provided with an air inlet pressing plate configured to control the air inlet and an exhaust pressing plate configured to control the air vent;

an air outlet assembly; and an adsorption separation assembly, wherein the air inlet assembly and the air outlet assembly are respectively connected to two ends of the adsorption separation assembly, and the cylinder is connected with the air inlet pressing plate and the exhaust pressing plate.

2. The adsorption separation device of claim 1, wherein the air vent is in communication with an exhaust valve.

3. The adsorption separation device of claim 1, wherein the first piston and the second piston separate the cylinder body into three independent chambers, and a sidewall of the cylinder body is provided with vent holes communicating with the three independent chambers respectively.

4. The adsorption separation device of claim 1, wherein a seal ring is arranged between the first shaft and the second shaft.

5. An adsorption separation device comprising:

a cylinder comprising a cylinder body, a first piston, and a second piston, wherein the first piston and the second piston are arranged inside the cylinder body and are spaced from each other, wherein the cylinder further comprises a first shaft and a second shaft, the first shaft extends into the cylinder body and is connected with the first piston, and the second shaft is slidably sleeved in the first shaft and connected with the second piston, and wherein each of an end of the first shaft extending out of the cylinder body and an end of the second shaft extending out of the cylinder body is provided with a screw connection portion.

6. The adsorption separation device of claim 1, wherein each of an outside of the first piston and an outside of the second piston is sheathed in a piston ring.

7. The adsorption separation device of claim 3, wherein each of the vent holes is in communication with a vent pipe joint.

* * * * *